United States Patent [19]
Myron

[11] 4,164,338
[45] Aug. 14, 1979

[54] FLEXIBLE RAIL ROLLER SYSTEM

[75] Inventor: Clayton E. Myron, Seattle, Wash.

[73] Assignee: Brooks & Perkins, Incorporated, Southfield, Mich.

[21] Appl. No.: 880,659

[22] Filed: Feb. 23, 1978

[51] Int. Cl.$^2$ .............................. B64C 1/20; B64D 9/00
[52] U.S. Cl. .............................. 244/118 R; 193/35 F;
193/35 SS; 414/529
[58] Field of Search ................. 244/137 R, 118 R;
193/35 R, 35 TE, 35 F, 35 SS; 104/135;
214/83.34, 84

[56] References Cited

U.S. PATENT DOCUMENTS

| | | | |
|---|---|---|---|
| 1,969,276 | 8/1934 | Pevear | 193/35 F |
| 3,203,527 | 8/1965 | Daetwyler | 193/35 SS |
| 3,765,552 | 10/1973 | Plunkett | 193/35 R |
| 3,991,493 | 11/1976 | Orth | 214/83.34 |

FOREIGN PATENT DOCUMENTS 136446  9/1933  Austria ........................... 193/35 F

*Primary Examiner*—Barry L. Kelmachter
*Attorney, Agent, or Firm*—Whittemore, Hulbert & Belknap

[57] ABSTRACT

The invention is in an aircraft provided with a flexible rail roller construction adapted to be positioned on the deck of a cargo space to provide for movement of cargo thereover and arranged to be quickly and easily moved to a storage position below the deck. To accomplish this the rollers are provided in a flexible track movable through a 180° arc at one end of the deck by engagement with a curved arcuate guide surface to extend in an inverted position beneath the deck. In a preferred embodiment roller supporting axles extended between midpoints of rigid plate-like links.

8 Claims, 10 Drawing Figures

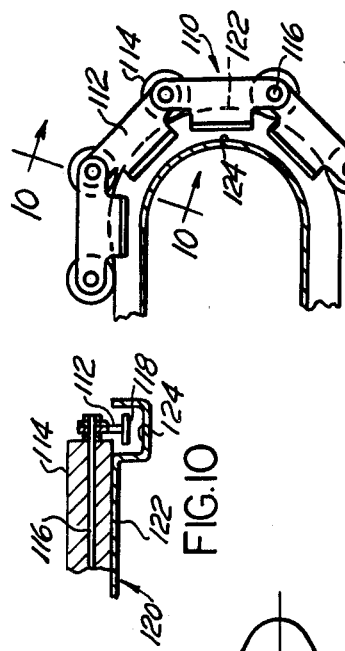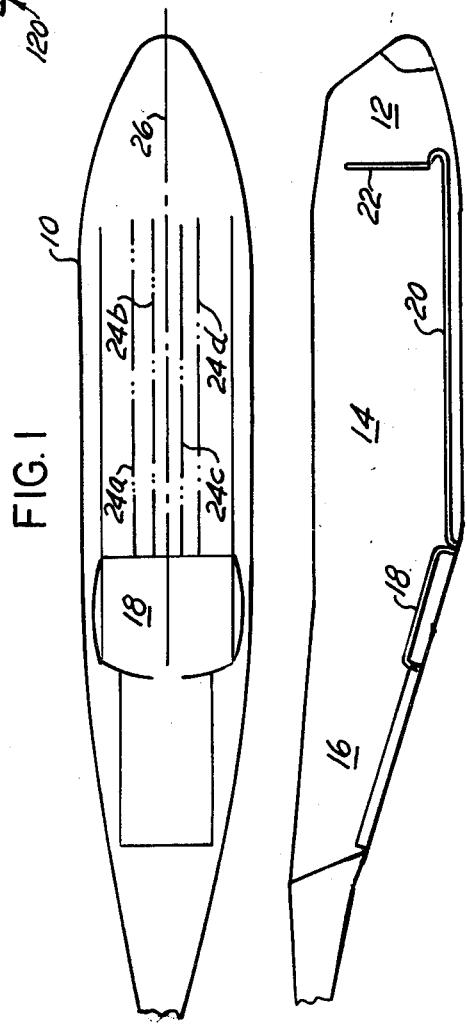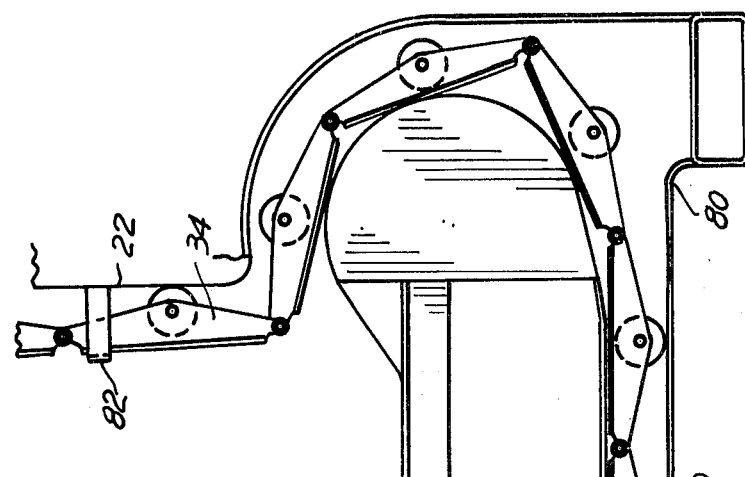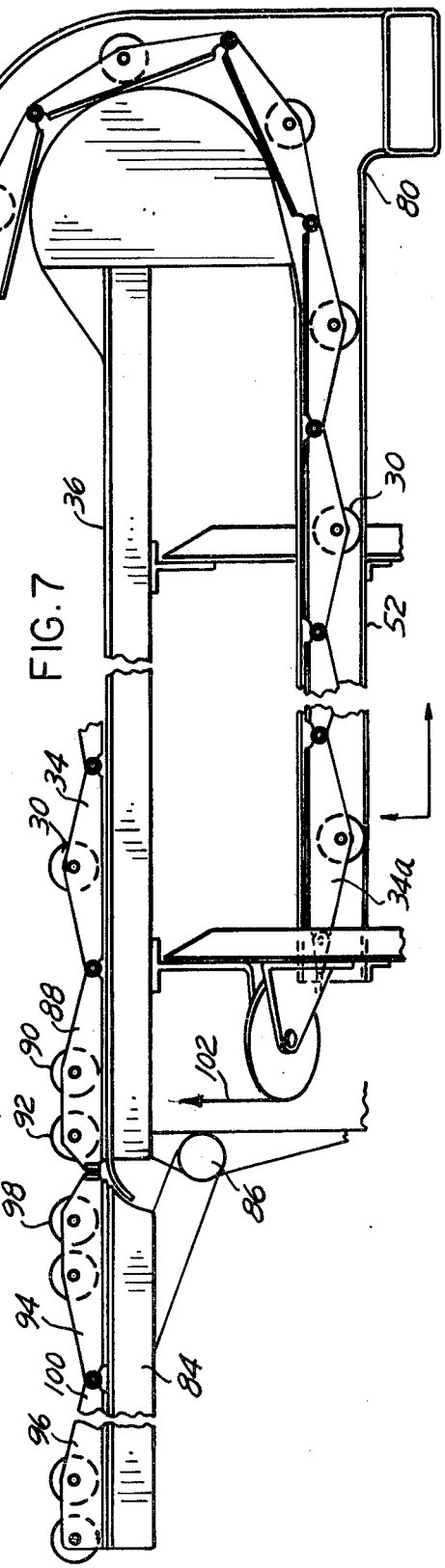

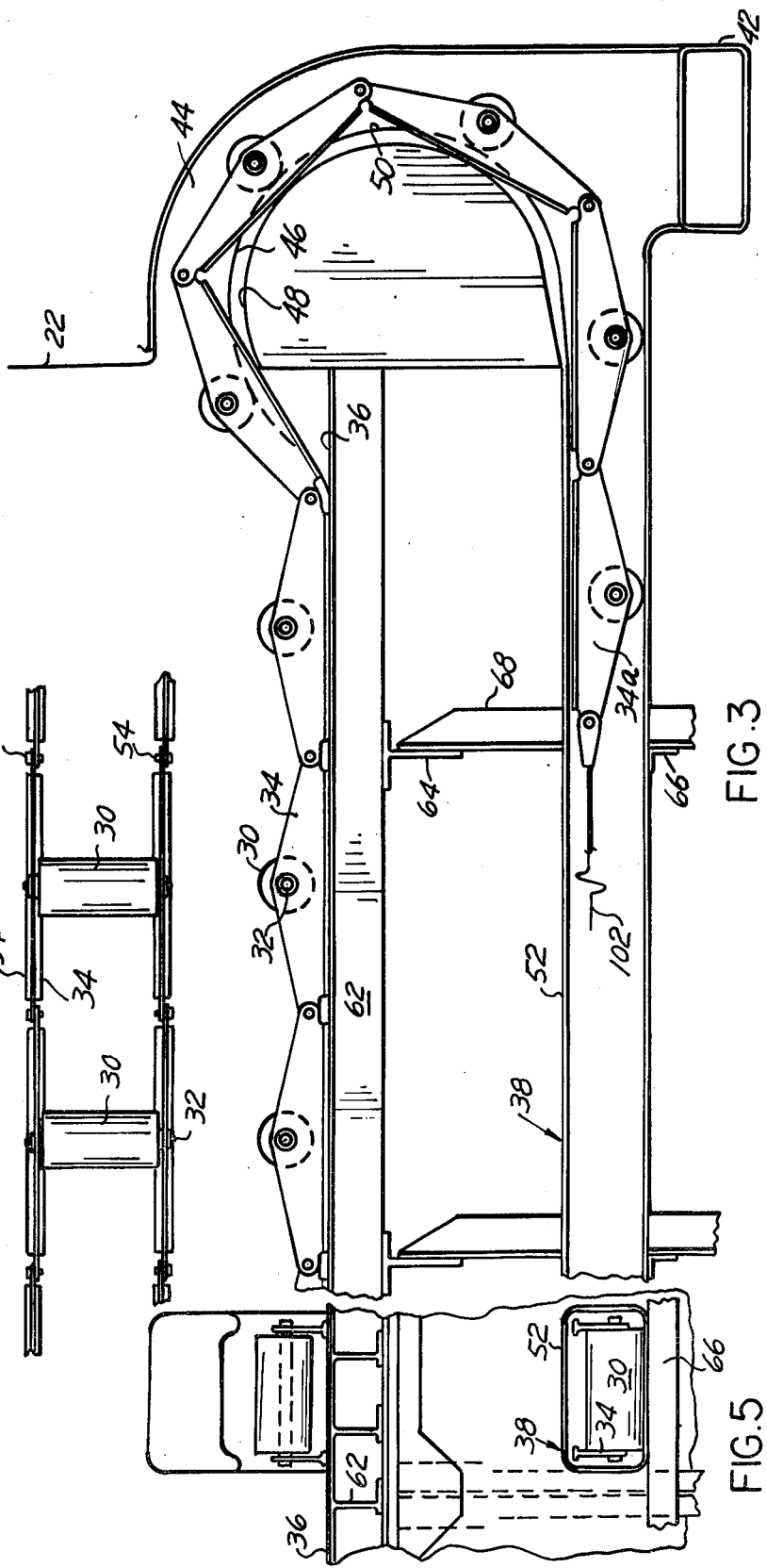
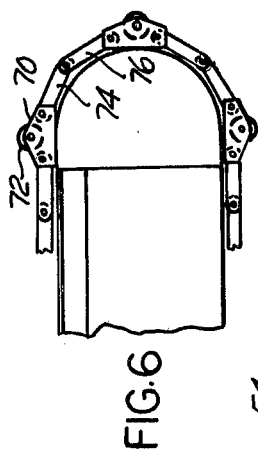
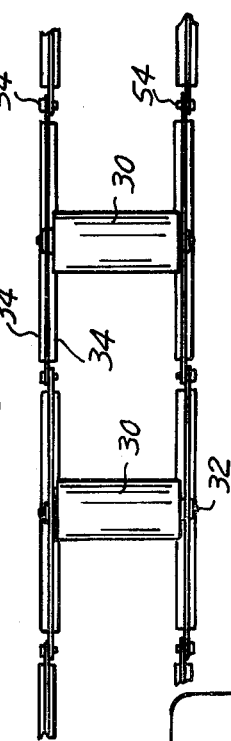
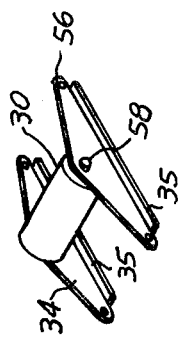

FLEXIBLE RAIL ROLLER SYSTEM

BACKGROUND OF THE INVENTION

It is desirable in aircraft to provide for conversion of space from utilization as essentially cargo carrying to other purposes. To accomplish this it is desirable to provide a multiplicity of rollers on the deck of the cargo space to facilitate movement of pallets, large containers or other articles thereover. When the space is to be utilized for other purposes, which do not require the presence of the rollers, it is desirable to remove the rollers.

In the past the installation and removal of rollers has been accomplished in various ways, such for example as provided rollers in a multiplicity of separate roller trays. This has necessitated a troublesome and time consuming operation in installation and removal of the trays and moreover requires separate storage of the trays when not in use.

It has previously been suggested to provide elongated flexible roller structure which can be mounted on the floor of a truck or trailer in which the individual rollers are mounted on flat sections having roller supporting flanges at their ends. These sections are said to be hinged or articulated. This construction is shown in prior U.S. Pat. No. 3,765,552.

The present invention is in the provision of elongated flexible rail support means for a plurality of rollers particularly adapted for use in the cargo compartment of aircraft and including means for moving the roller construction from an operating position in which it is supported on the deck of a cargo compartment to a stowed position in which it is received within an essentially tubular housing construction located below the deck.

BRIEF SUMMARY OF THE INVENTION

In accordance with the present invention a plurality of rollers are mounted between links interconnected to provide for flexibility of the roller construction. At the forward end of a cargo compartment of an aircraft an opening is provided at or slightly above the deck level, into an arcuate passageway through which a linked roller construction may be drawn through essentially a semi-circle so as to invert the rollers and lead the construction into an essentially tubular receptacle located closely below the deck of the cargo compartment.

The links are essentially suitably shaped flat plates which may be provided along their lower edges with narrow flat supporting flanges. The links are arranged in pairs at opposite sides of the construction and in a preferred embodiment of the invention, the links of an opposed pair of links is connected solely by a shaft which interconnects the links and which also provides support for one or more rollers. In this construction the ends of adjacent links are pivotally connected together.

In an alternative construction the links are arranged in oppositely disposed pairs at opposite sides of the roller construction, and the interconnection between the ends of adjacent links comprises elongated shafts or axles which serve not only to provide the pivot connection between interconnected links but also to provide the supports for the rollers.

In some cases the number of rollers is equal to a number of pairs of links but in other cases links may be provided intermediate the links to which roller supporting shafts are secured. This provides for greater flexibility of the roller construction and permits it to be reversed around a semi-circle path of considerably smaller radius.

The present invention also contemplates an arrangement in which the roller supporting housing beneath the deck of the storage compartment be in closer proximity to the deck. This is accomplished by providing a generally circular path for the linkage having an opening located above the deck of the storage compartment.

It is also contemplated that in some cases that portion of the roller construction which occupies the rear or after end of the cargo compartment may, in storage position, be positioned against the rear of a bulkhead at the forward end of the cargo compartment.

BRIEF DESCRIPTION OF THE DRAWINGS

FIG. 1 is a diagrammatic plan view of the body of a cargo carrying aircraft.

FIG. 2 is a side elevation of the figure shown in FIG. 1.

FIG. 3 is an enlarged side elevational view of the flexible roller construction and associated aircraft components.

FIG. 4 is an end view of the construction shown in FIG. 3.

FIG. 5 is a plan view of the roller construction shown on a smaller scale.

FIG. 6 is a fragmentary side elevational view of a modified flexible roller conveyor.

FIG. 7 is a view similar to FIG. 3 illustrated in modified construction.

FIG. 8 is a perspective view of a roller and link subassembly.

FIG. 9 is a diagrammatic illustration of a further embodiment.

FIG. 10 is a fragmentary section on the line 10—10, FIG. 9.

DETAILED DESCRIPTION

Referring first to FIGS. 1 and 2 there is shown the fuselage 10 of an aircraft having a forward pilot's compartment at 12, a main cargo storage compartment 14 and after storage space indicated at 16. Access to the interior of the cargo space is through a ramp 18 which may be swung counterclockwise from the position illustrated in FIG. 2 about hinge means adjacent to its forward edge to provide a ramp for the introduction of cargo into the aircraft. At 20 there is diagrammatically indicated an arrangement of rollers provided by a flexible roller assembly later to be described. A bulkhead is indicated at 22 constituting a partition between the pilot's compartment and the cargo space.

It will be understood that depending upon conditions such as the width of the aircraft, the type and weight of containers and other cargo to be stored, the specific details of the rollers which may vary. Thus, for example, there may be a plurality of separate roller assemblies as indicated diagrammatically at 24a, 24b, 24c and 24d, which will normally be disposed symmetrically about a longitudinally center line indicated at 26.

Referring now to FIGS. 3, 4 and 5 the flexible roller assembly comprises a multiplicity of rollers 30 mounted on shafts 32 extending between the flat elongated links 34. Links 34 are elongated to extend longitudinally when the roller construction is in operating or stored position, with its width dimension always in a vertical plane. The links at each side of the construction form an articulated rail, and the only connection between the rails at opposite sides of the construction is constituted by the roller support shafts 32.

As shown in FIG. 5 a single roller may be provided intermediate opposed links 34 or if preferred a plurality of separate independent rotatable rollers may be provided, as well understood in the art. In the operating position of the rollers illustrated in the upper portion of FIG. 3, flanged lower edge portion 35 of the links 34 rest upon the horizontal floor or deck 36 of the cargo compartment. In this figure the flexible roller construction is illustrated as in the position which it will occupy when it is in the process of being stored. At this time the normally leading links 34a have been drawn around a semi-circular guide construction and are inverted within a longitudinally extending generally tubular elongated portion of a housing 38.

Housing 38 is preferably formed of a suitable composition material such as for example fiberglass and at its forward end is provided with a cover portion 40 including a downwardly extending flush-out duct portion 42 which will be provided with a pressure door to maintain the air pressure integrity of the aircraft. Duct portion 42 of course constitutes a drainage vent which prevents accumulation of water or other liquid in housing 38. This door may be of conventional design and is not illustrated. The housing 38 as best seen in FIG. 4 includes a stowage portion 52 of tubular construction and of general rectangular cross section, dimensioned to receive a flexible roller construction including rollers 30 and pivotally interconnected links 34. The upwardly extending housing portion of the storage housing 38 is located forwardly of the bulkhead 22 to guide the leading end of the flexible roller construction into and around the generally arcuate passageway 44. There is provided a curved guide 46 which may if desired be provided with arcuate channels 48 adapted to receive the flanges 34 and an intermediate raised surface 50 adapted to be contacted by the rollers 30 as the flexible roller construction is led around the arcuate guide passage 44. The opening into housing 38 is located above deck 36 to provide guide surface 46 with an increased radius of curvature.

Preferably the elongated generally horizontal portion 52 of the housing slopes downwardly and forwardly to assist in flushing the housing portion 52.

As best seen in FIG. 4 the links 34 are provided in pairs at opposite sides of the construction and the ends of the links are pivotally interconnected by suitable means such as rivets or pins with snap rings indicated at 54. These connections, as best seen in FIG. 4, are dimensioned to leave the space between the rails completely unobstructed except for the shafts 32 and rollers 30 carried thereby. With this construction it will be observed that the only connection between the links at opposite sides of the construction are the pivot pins or shafts 32 which extend to the openings provided adjacent the top central portion of each link.

It will be understood that the flexible roller construction rests freely upon the upper surface of the deck 36 although of course if considered necessary or desirable, suitable guide means for the links could be provided on the deck.

Referring now to FIG. 8 there is an enlarged prespective view of a section of the flexible linkage illustrated in FIGS. 3 to 5. Here it will be observed that the links 34 are provided adjacent their ends with openings 56 which receive the pivot connections 54 previously referred to. The rollers 30 are freely rotatable on shafts 32 which extend through the rollers, the ends of the shafts being illustrated in FIG. 8 at 58. Extending longitudinally of each link 34 is an elongated relatively narrow flange 35 which terminates short of the end portions of the links. Flanges 35 provide substantially area support on the deck of the cargo compartment and in addition stablize the flexible roller assembly. Flanges 35 may be welded to extend to both sides of the flange 34 or they may be provided by lateral bends, and if desired, return bends, to extend to both sides of the link 34.

It will of course be appreciated that where shown in FIG. 9, the rollers extend into close proximity to the inner surface of opposite links 34, the rollers themselves provide for increased stability of the construction.

Referring again to FIGS. 3 and 4, it will be observed that the floor 36 of the aircraft rests upon longitudinally extending girders 62 which in turn rest upon transversely extending girders 64. The housing structure, 38 is supported by L-shaped brackets 66 secured to vertically extending aircraft frame elements 68.

Referring now to FIG. 6 there is illustrated a modification of the flexible roller construction in which links 70 supporting rollers 72 are connected to links 74 and 76 to increase the flexibility of the flexible roller construction. With this arrangement the flexible roller construction may be inverted in an arc of smaller radius and fed rearwardly in the elongated portion 52 of the housing.

Reference is now made to FIG. 7. In this figure the storage chute here designated 80 is substantially the same as the housing and storage structure 38 previously described. This construction illustrates a concept in which the bulkhead 22 which separates the pilot's compartment from the cargo storage space is provided with brackets 82 in which the last few links of the flexible roller construction may be lifted and supported against the rear surface of the bulkhead 22 thus permitting the use of a somewhat shorter storage chute 80.

In this construction there is illustrated a cargo ramp 84 pivoted as indicated at 82 which in its raised position may constitute a closure for an opening into the after end of the cargo storage compartment. In this case the normally rear or after link here designated 88 of the flexible roller construction is somewhat differently shaped than as previously described and is provided with a pair or rollers here designated 90 and 92. Provided on the cargo ramp 84 are links 94 and 96 provided with a pair of transversely extending rollers 98. Links 94 and 96 constitute the end links of flexible roller construction provided for the movable cargo ramp 84. Intermediate the links 94 and 96 may be provided a number of links 100 which may be identical with the links 34 previously described and carrying the rollers 30.

The forward link 34a of the flexible linkage is provided with a flexible cable 102 which may be led to a winch mounted within the aircraft, which may be operated to pull the flexible roller construction to the stowed position indicated in FIG. 7. Obviously a flexible cable may be connected to the other end of the flexible roller construction and lead to the winch to draw the flexible cable from its stowed position within the housing structure 52 or 80, to operating position on deck 36.

In both constructions it will be observed that the horizontal portion 52 of the housing or storage tube 38 and the corresponding portion of the housing or storage tube 80 provides a floor surface over which the rollers 30 move with a rolling action. This minimizes the force required to move the flexible rollers construction between its stowed and operating position. This is of considerable importance because in a typical construction the horizontal portion of the storage chute may be approximately 600 inches or 50 feet in length or more. While the construction is particularly designed to minimize weight, nevertheless this length of flexible roller construction necessarily has substantial weight and requires considerable force to move between operating and stowed position, particularly since it is required to move around a generally semi-circular guide structure 46, 48.

It will be observed in this connection that with the construction provided in FIG. 3, the links and rollers actually moving within the generally semi-circular passage 44 move with the rollers 30 in rolling contact with the raised guide surface 50. The channels 48 are of sufficient depth so that the only contact between the flexible roller construction and any portion of the semi-circular guide passage 44 is provided by the freely rotatable rollers 30.

Referring now to FIGS. 9 and 10 there is illustrated yet another embodiment of the invention. In these figures the flexible roller construction is indicated more or less diagrammatically generally at 110 and comprises links 112 and roller 114. The rollers 114 are mounted on shafts 116 which extend between opposite links 112 and the shaft 116 also constitute the means for pivotal interconnecting the ends of adjacent links 112. With this arrangement, there is a roller 114 carried at the end of each link 112.

As before the rollers extend above the top of the links so that they engage and support cargo as it is advanced over the roller construction and the rollers are supported above the plane of the deck by the foot portions 118 of links 112.

As the flexible roller construction is advanced around a circular path thereof in moving between operating position and stowed position, a generally semi-circular guide is provided which includes a cylindrical portion 122 engaged by the rollers 114. The foot portions 118 of the links move in clearance and if desired the edges of the guide member 120 are formed with channels 124 which receive the links. With this construction as with other embodiments of the invention the flexible roller construction is movable around generally semi-circular guide means while only rolling contact between the flexible rail roller construction and the guide means is preserved.

By providing pure rolling contact between all elements of the flexible roller construction and the guide means which includes the generally semi-circular construction and the straight portion, friction is reduced to a point where the flexible roller construction may be drawn into the portions 52 stowage members such as 38 despite the fact that the flexible roller construction may be of very considerable length as for example 50 feet.

The links which are provided in opposing pairs and in which each link is pivotally connected at its ends to adjacent links, are in the form of elongated flat plates. This of course signifies that the links have length, width and thickness dimensions. It will be observed that in all cases, in operating position and in stowed position, the links are positioned with the width dimensions vertical.

What is claimed is:

1. In an aircraft, an elongated cargo carrying space having a deck, an elongated flexible rail roller construction having an operating position in which the roller construction rests on said deck and a stowed position in which said roller construction is received in inverted position beneath said deck, said roller construction comprising laterally spaced flexible rails each comprising elongated generally flat links, pivot connections at the ends of adjacent links articulating the links of each rail for pivot movement about axes perpendicular to the planes of the links, roller support shafts extending transversely of the construction between the rails and constituting the sole connection between corresponding links at opposite sides of the roller construction, rollers on the shafts, guide means of generally semi-circular cross-section at one end of said cargo carrying space around which said roller construction is drawn in moving between the aforesaid operating and stowed positions, said guide means extending up between said rails for engagement only with said rollers, and tension means connected to end of said roller construction at the said one end of said cargo carrying space to draw the roller construction from said operating position to said stowed position.

2. Structure as defined in claim 1, in which the pivot connections between adjacent links are dimensioned to leave the space between the rails completely unobstructed except for the rollers and roller supporting shafts.

3. Structure as defined in claim 1, in which the roller supporting shafts constitute the pivot connections between adjacent articulated links.

4. Structure as defined in claim 1, in which said guide means forms one end portion of a housing extending longitudinally of the aircraft beneath the deck thereof, said housing having a floor surface along which the roller construction is movable while supported thereon solely by said rollers.

5. Structure as defined in claim 4, said housing having an opening adjacent the forward end of said cargo carrying space located substantially above the deck level thereof, to provide for an increased radius of curvatuve of said guide means while providing for stowage of said roller construction in proximity to said deck.

6. Structure as defined in claim 5, said guide means comprising a tubular construction having a longitudinally extending portion, and an upwardly and reversely curved portion, said cargo carrying space having a forward bulkhead, the reversely curved portion of said housing opening through said bulkhead substantially above said deck, and retainer means on said bulkhead above the opening into said curved portion to engage and support one end of said roller construction when the remainder of said roller construction is within said housing.

7. Structure as defined in claim 4, in which the longitudinally extending portion of said housing is inclined slightly from the horizontal, and a drainage vent extending through the bottom of said housing adjacent the lower end thereof.

8. In an aircraft, an elongated cargo carrying space having a deck, an elongated flexible roller construction comprising flexible rails, formed by pairs of laterally spaced opposed links each pivotally connected at its ends to adjacent links, roller supporting shafts extending between corresponding links in said rails, rollers on said shafts, said roller construction having an operating position in which said roller construction rests on said deck and a stowed position in which said roller construction is received in inverted position beneath said deck, and guide means of generally semi-circular cross-section adjacent one end of said deck around which said roller construction is drawn in moving between the aforesaid operating and stowed positions, said guide means comprising a generally semi-cylindrical guide surface with which only the rollers of said roller construction contact, and arcuate channels at the edges of said guide surface to receive said links.

* * * * *